(No Model.)
L. WEST.
PIPE COUPLING.
No. 349,549. Patented Sept. 21, 1886.
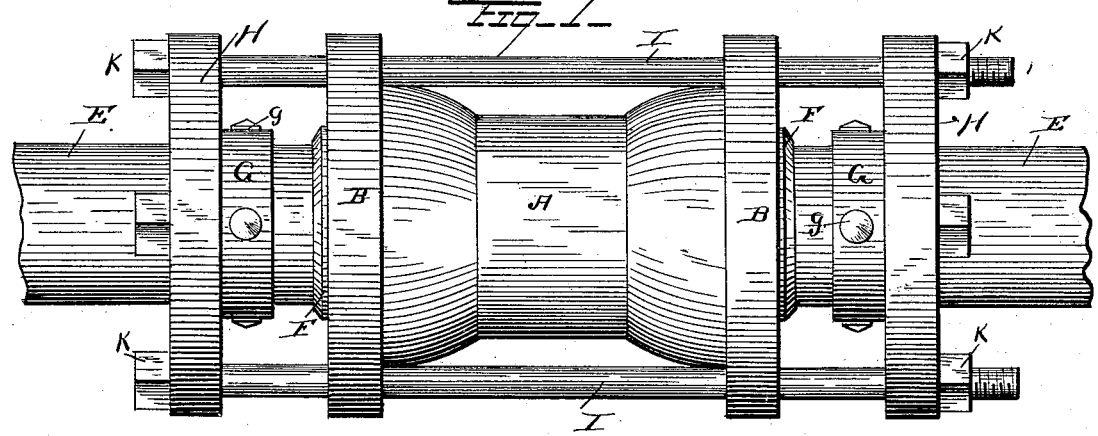
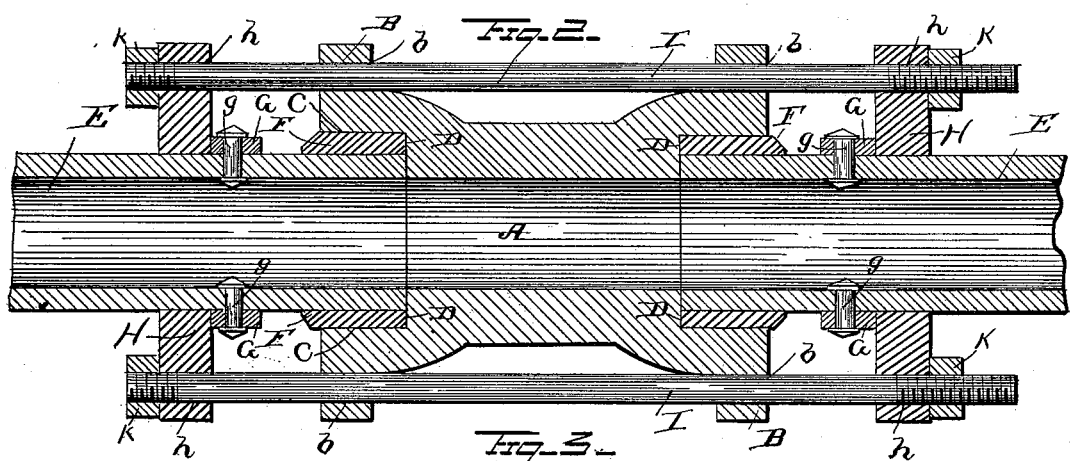
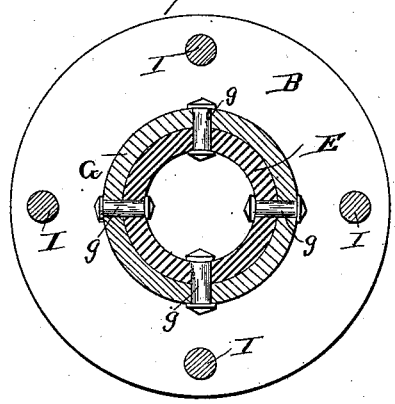
Witnesses                    Inventor
                             Leander West
                          By his Attorneys

UNITED STATES PATENT OFFICE.

LEANDER WEST, OF BAKERSVILLE, PENNSYLVANIA.

PIPE-COUPLING.

SPECIFICATION forming part of Letters Patent No. 349,549, dated September 21, 1886.

Application filed June 5, 1886. Serial No. 204,252. (No model.)

*To all whom it may concern:*

Be it known that I, LEANDER WEST, a citizen of the United States, residing at Bakersville, in the county of Somerset and State of Pennsylvania, have invented a new and useful Improvement in Pipe-Couplings, of which the following is a specification.

My invention relates to an improvement in pipe-couplings; and it consists in the peculiar construction and combination of devices, that will be more fully set forth hereinafter, and particularly pointed out in the claims.

In the drawings, Figure 1 is a side elevation of a pipe-coupling embodying my invention. Fig. 2 is a vertical longitudinal sectional view of the same. Fig. 3 is a vertical transverse sectional view.

A represents a hollow cylindrical sleeve, which may be made of either cast or wrought iron, and is provided at its ends with flanges B. The bore of the sleeve corresponds in diameter to the interior diameter of the pipes which it is adapted to couple, and the ends of the sleeves are counterbored to receive the ends of the pipes, the said counterbores C being of a larger diameter than the exterior diameters of the pipes, thereby forming shoulders D at the inner ends of the counterbores.

E represents the pipes to be coupled to the sleeve.

F represents annular collars, which are made of wrought-iron. The exterior diameter of the said collars is equal to the interior diameter of the counterbores C of the sleeve, and the interior diameter of the said collars is equal to the exterior diameter of the pipes. In order to secure the collars F in the counterbored ends of the sleeve, the said sleeve is first heated and thereby caused to expand, and the collars are placed cold in the counterbores C of the sleeve. As the latter cools, it contracts upon the collars, thereby securing them firmly in the ends of the sleeve.

G represents collars or annular flanges, which are secured on the pipes E at a slight distance from the inner ends thereof. In order to secure the said collars or annular flanges to the pipes, they are first heated and placed over the pipes, and in cooling contract and become firmly attached to the pipes, as will be very readily understood. To prevent the possibility of their working loose, I pass rivets $g$ through the said collars and pipe.

H represents a pair of circular disks, which are made of wrought or cast iron, and are provided with central openings of sufficient size to admit the pipes E. These disks correspond in diameter to the flanged ends of the sleeve A, and through the said flanged ends of the sleeve are made transverse openings $b$.

I represents a series of bolt-rods, which extend through the openings $b$ in the flanges of the sleeve. The ends of these rods are screw-threaded for a considerable distance, and nuts K are adapted to screw onto the threaded ends of the rods.

The disks H are provided each with a series of transverse openings, $h$, near their outer edges, which are adapted to register with the openings $v$ in the flanges of the sleeves.

In order to form a coupling, the pipes E are inserted into the rings F (which are secured in the counterbored ends of the sleeve) until the inner ends of the said pipes come in contact with the shoulders D of the sleeve. The disks H are slipped over the pipes, and are moved inwardly thereon until they reach the collars G and bear against the outer edges thereof, and the ends of the rods I are then passed through the openings $h$ in the said disks, and the nuts K are screwed onto the ends of the said rods, thereby compressing the disks firmly against the outer edges of the collars G, and thus preventing the pipes from being withdrawn from the ends of the sleeves. Prior to thus securing the disks H against the rings G the outer end of the collars F, which project slightly beyond the outer ends of the sleeve, are swaged or calked, so as to form perfectly-tight joints with the pipes, and thus prevent leaking.

It will be observed that when the pipe-coupling is formed the interior sides of the pipes are exactly flush and in line with the bore of the sleeve, thus leaving the interior of the pipes entirely unobstructed, and permitting the free passage of the gas, oil, or water through the pipes. It will also be observed that the inner ends of the pipes are clamped firmly against the shoulders D of the counterbored openings in the ends of the sleeve, thus preventing the gas, water, or liquid in the pipes from getting between the ends of the pipe and of the sleeve, and thus exerting longitudinal pressure, tending to force the pipes from the sleeve and thus destroy the coupling.

A pipe-coupling thus constructed is particularly adapted for conveying natural gas at a very high pressure under the ground from one point to another, is exceedingly strong and durable, is not likely to leak, and permits the pipes to be raised and coupled together very rapidly without the use of a skilled mechanic.

I prefer, in forming the couplings, to swage one end of the collar F in one end of the sleeve to one end of the pipe before leaving the shop, thus rendering it only necessary to swage the collar in the opposite end of the sleeve to the end of the adjacent pipe when laying the pipes in the trench.

Having thus described my invention, I claim—

1. The combination of the sleeve having the counterbored openings in its ends with the pipes having the disks H and the collars F shrunk onto the ends of the said pipes, the said collars being adapted to enter the counterbored openings in the sleeve, and the clamping-rods connecting the disks to secure the ends of the pipes in the ends of the sleeve, substantially as described.

2. The combination of the sleeve A, having the counterbored openings C in its ends, and the end flanges, B, with the collars F, secured in the counterbores C, the pipes having their ends attached to the said collars and provided with the flanges G, the disks H on the said pipes and bearing against the said flanges, and the screw bolts or rods I, passed through openings in the said disks and in the flanges B of the sleeve, for the purpose set forth, substantially as described.

In testimony that I claim the foregoing as my own I have hereto affixed my signature in presence of two witnesses.

LEANDER WEST.

Witnesses:
B. F. FLECK,
OLIVER KNEPPER.